W. BARTHOLOMEW.
VARIABLE SPEED FRICTIONAL DRIVE MECHANISM.
APPLICATION FILED MAY 15, 1911.
1,108,672.
Patented Aug. 25, 1914.
4 SHEETS—SHEET 4.
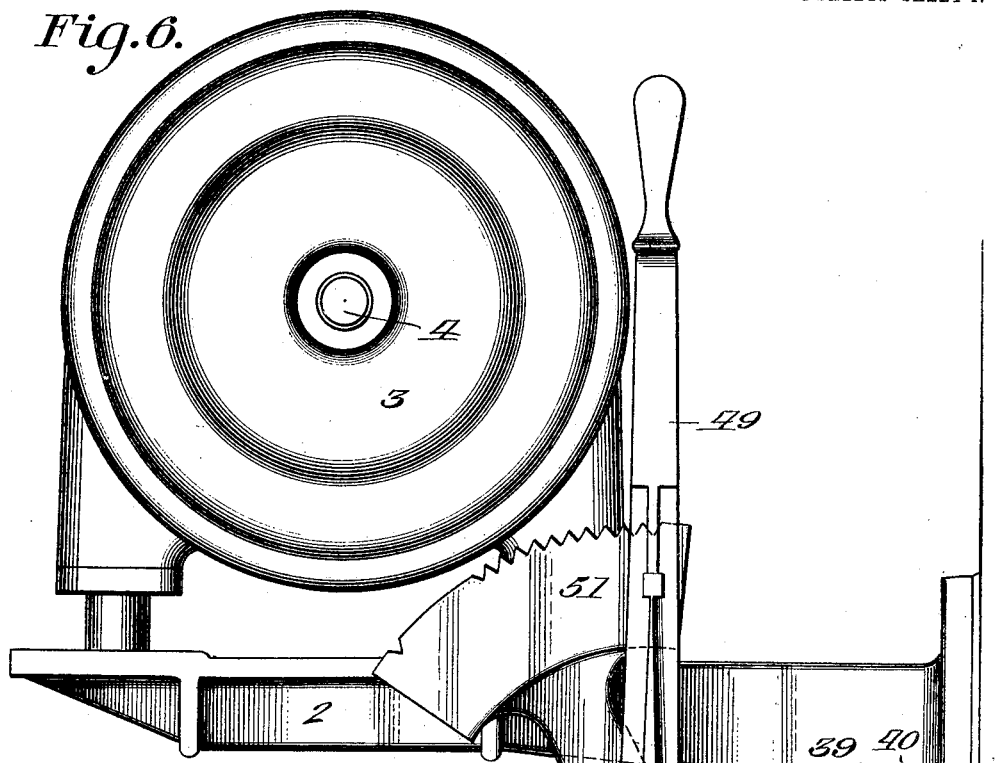
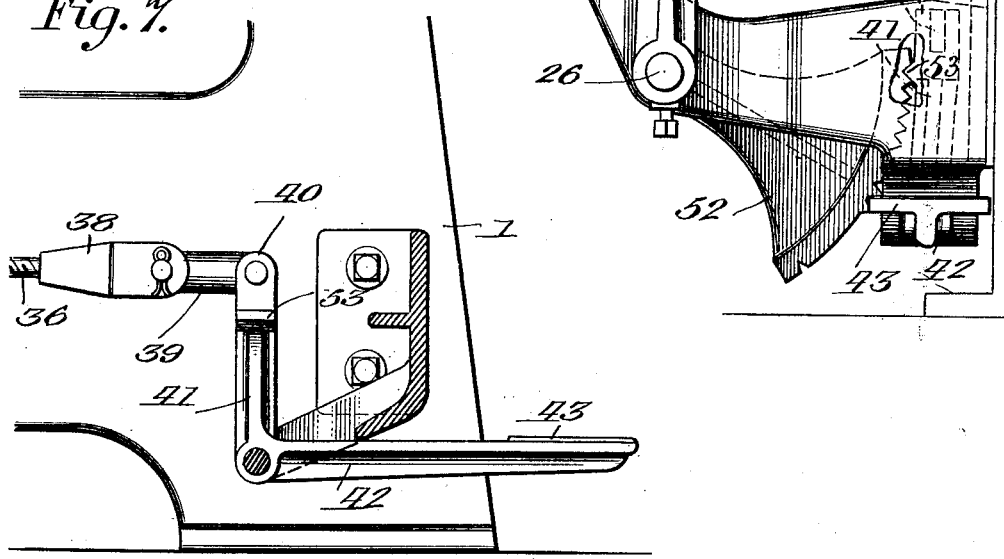
WITNESSES
INVENTOR
William Bartholomew

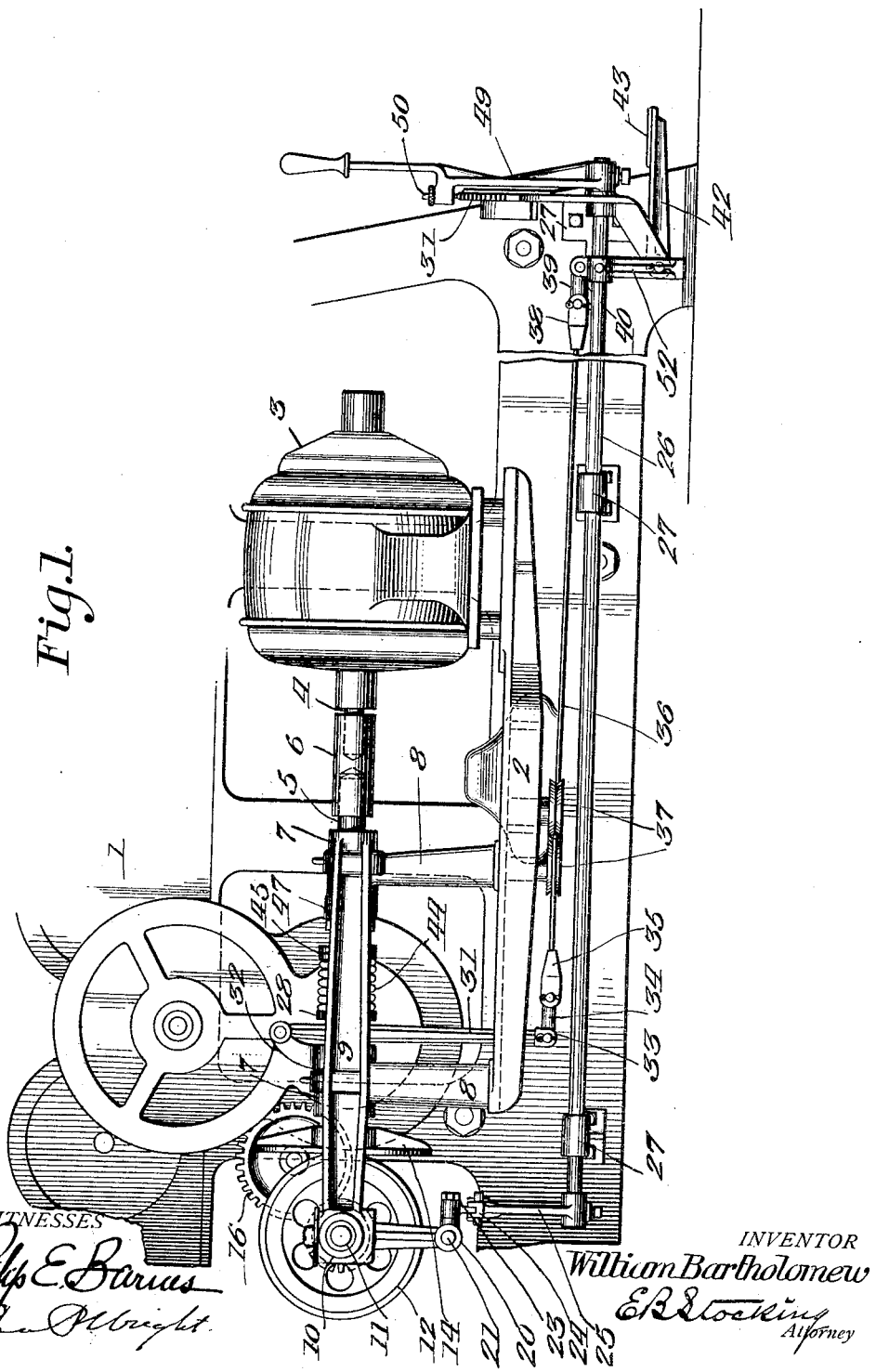

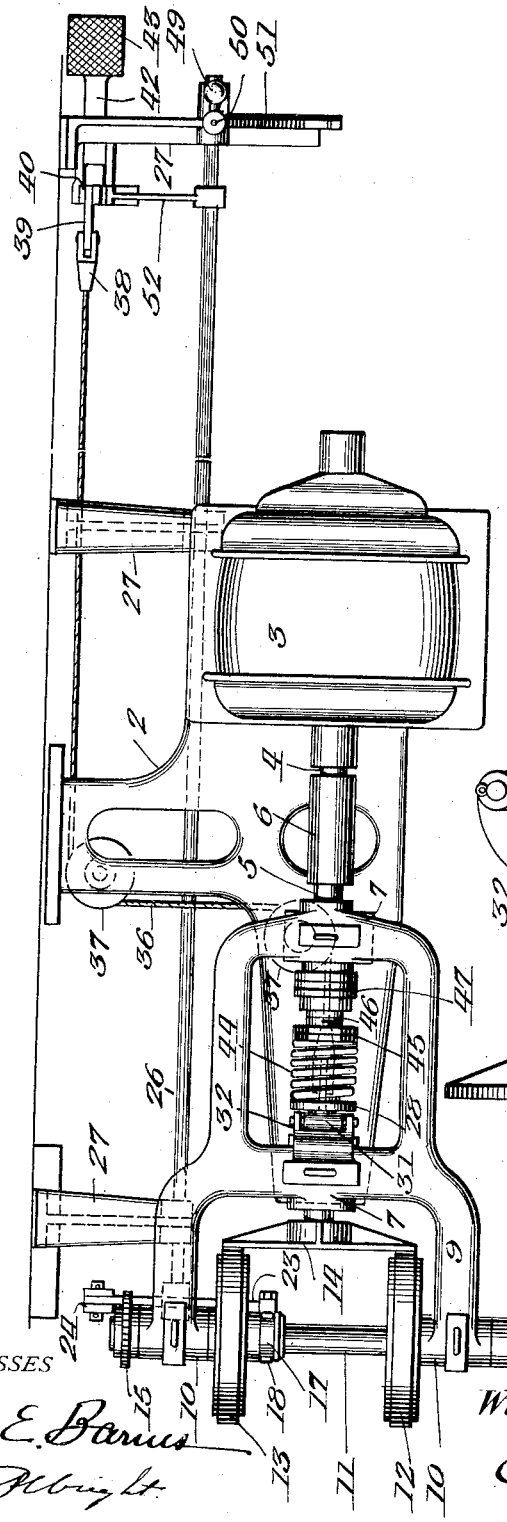

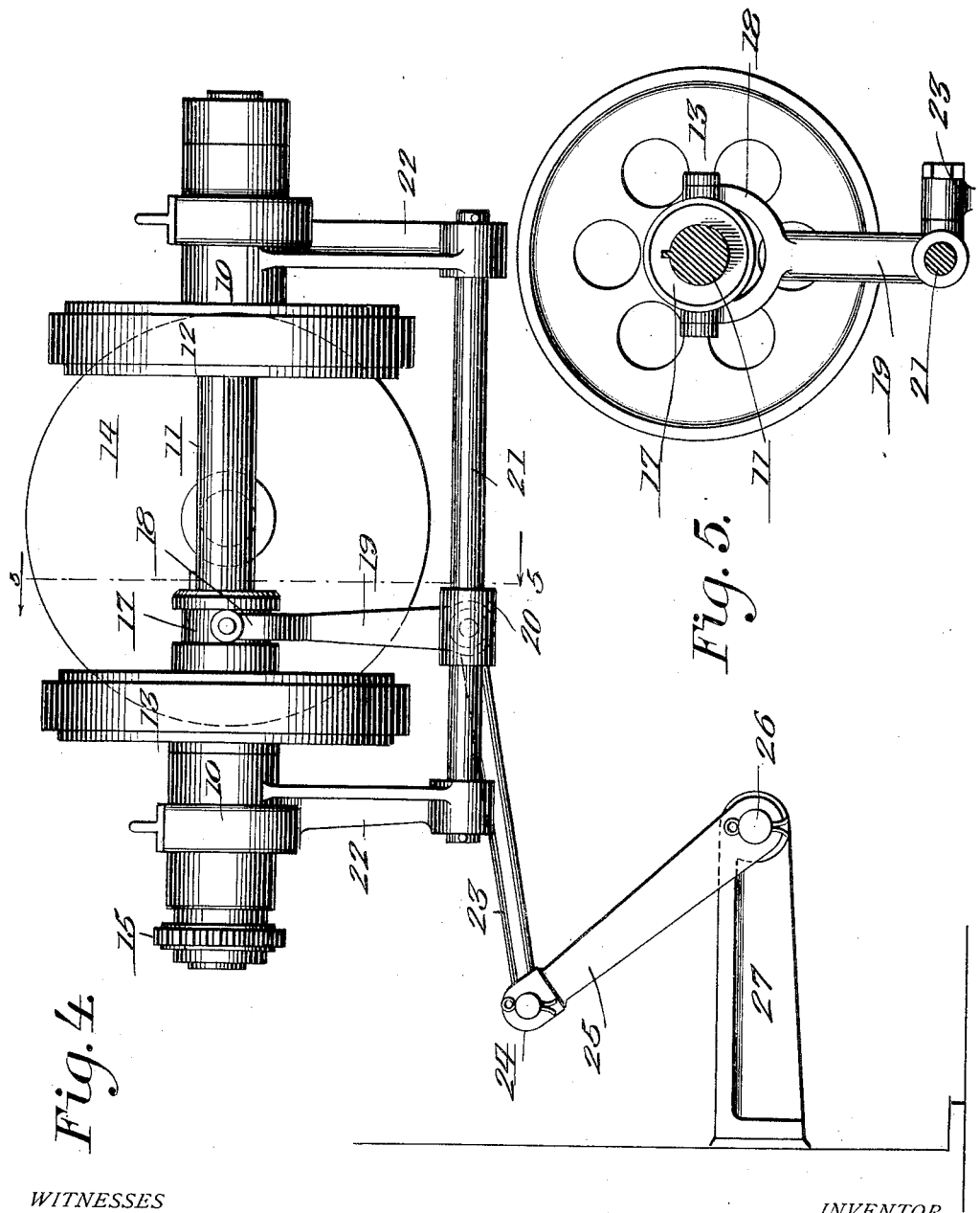

UNITED STATES PATENT OFFICE.

WILLIAM BARTHOLOMEW, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

VARIABLE-SPEED FRICTIONAL DRIVE MECHANISM.

1,108,672.  Specification of Letters Patent.  Patented Aug. 25, 1914.

Application filed May 15, 1911. Serial No. 627,269.

*To all whom it may concern:*

Be it known that I, WILLIAM BARTHOLOMEW, a citizen of the United States, residing at Chicago, county of Cook, State of Illinois, have invented certain new and useful Improvements in Variable-Speed Frictional Drive Mechanism, of which the following is a specification, reference being had therein to the accompanying drawing.

This invention relates to variable speed frictional drive mechanism especially constructed to be used in connection with ironing machines of all characters which are driven by electric motors, the object being to provide driving mechanism which is so constructed that the speed of the ironing machine may be quickly changed by the operator.

Another object of the invention is to provide a frictional drive in which the driven member is adjustably mounted in respect to the driving member, the controlling mechanism of said members being so connected that it will be impossible to move the driven member in respect to the driving member without first shifting the driving member, whereby all danger of stripping the frictional surface of the periphery of the driven member is prevented.

A further object of the invention is to provide a driving mechanism which is so constructed that the shifting of the mechanism to change its speed will be gradual, the driving member being held in engagement with the driven member by a spring.

A still further object of the invention is to provide a driving mechanism which is exceedingly simple in construction, the parts being so arranged and connected that all danger of the mechanism becoming out of order when in operation is prevented.

Another object is to provide a treadle mechanism for shifting the driving member which engages and locks the lever for shifting the driven member whereby it will be impossible for the operator to change the speed of the driving mechanism without first operating the treadle to throw the driving member out of engagement with the driven member.

Other and further objects and advantages of the invention will be hereinafter set forth and the novel features thereof defined by the appended claims.

In the drawings—Figure 1 is a side elevation of my improved driving mechanism showing its application to a six roll flat work ironer; Fig. 2 is a top plan view of the driving mechanism; Fig. 3 is a detail longitudinal vertical section through a portion of the driving mechanism; Fig. 4 is an end elevation of the shifting mechanism for changing the speed; Fig. 5 is a section taken on line 5—5 of Fig. 4; Fig. 6 is an end elevation of the shifting lever and treadle mechanism; and Fig. 7 is a detail vertical section showing the manner of mounting the treadle.

Like numerals of reference refer to like parts in the several figures of the drawings.

In the drawings, 1 indicates a portion of a six roll flat work ironing machine which is provided with the usual master gear, herein shown incased. Extending outwardly from the side of the frame of the ironing machine is an auxiliary frame 2 on which is mounted an electric motor 3 having a drive shaft 4 connected to the driving shaft 5 of the mechanism by a coupling 6 which allows the driving shaft 5 to have a longitudinal movement within the coupling as clearly shown. The shaft 5 is mounted in suitable bearings 7 formed on the upper ends of standards 8 of the frame 2, said standards having formed integral therewith a frame 9.

The frame 9 terminates in outwardly projecting arms having bearings 10 in which is journaled a driven shaft 11 which is provided with frictional disks 12 and 13 adapted to be engaged by a frictional driving disk 14 fixed on the end of the shaft 5. The disk 12 is loosely mounted on the shaft 11 and the disk 13 is keyed thereon so as to move longitudinally in order to shift its position in respect to the center of the driving disk 14 whereby the speed of the driven shaft 11 can be changed. The driven shaft 11 carries a pinion 15 which meshes with an intermediate gear 16 which, in turn, meshes with the master gear of the ironing machine whereby the ironing machine will be driven in such a manner that the speed of the same may be varied.

For moving the driven disk 13 upon the driven shaft 11, I provide the disk with an annularly grooved hub 17 in which the yoked end 18 of an arm 19 is loosely mounted, said arm having an integral sleeve portion 20 which is slidably mounted upon a guide rod 21 carried by depending arms 22 of the bearings 10. Pivotally connected to the sleeve 20 is a link 23, the free end of which is mounted in the bifurcated end 24 of a crank arm 25 fixed on the end of a rock shaft 26 mounted in suitable supports 27. It will be seen that by rocking the shaft 26, the sleeve 20 will be moved upon the guide rod 21 in such a manner that the driven disk will be shifted on the driven shaft in order to change its position in respect to the driving disk.

Fixed on the shaft 5 is a collar 28 adapted to be engaged by anti-friction rollers 29 carried by the circular portion 30 of a pivotally mounted lever 31, said lever being mounted in a bracket 32. The lever 31 is provided with a bifurcated lower end 33 in which is pivotally mounted a link 34 to which is connected a coupling 35 carried by the end of a cable 36 which passes over guide pulleys 37 and has a coupling 38 at its other end which is connected to a link 39 mounted in the bifurcated end 40 of the vertical arm 41 of a treadle 42 which is provided with a foot piece 43. By this construction, the driving disk 14 may be moved out of engagement with the driven disk and the idle disk.

For normally holding the driving disk in engagement with the driven disk and idle disk, I provide a coiled spring 44 which surrounds the shaft 5 and engages the collar 28 at one end and adjusting nuts 45 at its other end carried by a sleeve 46 mounted upon the shaft 5 which is provided with a collar 47 adapted to engage thrust bearings 48 carried by the bearing 7 and it will be seen that by this construction, the tension of the spring 44 may be adjusted in order to regulate the pressure of the driving disk against the driven disk and idle disk.

Fixed on the end of the rock shaft 26 is a lever 49 for rocking the shaft, said lever having a spring actuated detent 50 engaging a segmental rack 51 for locking the same in its adjusted position in order to change the speed of the ironing machine. The rock shaft 26 carries a segmental rack 52 which is engaged by a lug 53 of the treadle 42 in such a manner that the rock shaft is locked when the treadle is in its normal position, thereby preventing the swinging of the rock shaft to change the speed until the treadle has been depressed to move the driving disk out of engagement with the driven disk. It will be seen that by this construction, it is impossible to change the speed of the machine without first operating the treadle, whereby all danger of stripping the frictional engaging surface of the driven member is prevented.

Having described my invention and set forth its merits what I claim and desire to secure by Letters Patent is:

1. In a driving mechanism, the combination with a movable driven member, of a driving member mounted to engage said driven member, a rock shaft, a connection between said rock shaft and driven member, a lever for rocking said shaft, a segment fixed on said rock shaft, a treadle, a flexible connection between said treadle and driving member, and a lug extending laterally from said treadle in the path of travel of said segment.

2. In a driving mechanism, the combination with driving and driven members mounted to move at right angles to each other, of a rock shaft for moving said driven member, a pivoted lever for moving said driving member in one direction, a spring for moving said driving member in a reverse direction, a treadle for shifting said lever, a segmental rack carried by said rock shaft, and a lug arranged on said treadle in the path of travel of said segmental rack.

3. In a driving mechanism, the combination with a driven member and a driving member mounted to move at right angles to each other, of a spring for holding said driving member in contact with the driven member, a treadle-control for said driving member, a rock shaft-control for said driven member, a segment on said rock shaft, and a lug extending from said treadle in the path of travel of said segment.

4. In a driving mechanism for ironing machines, the combination with a driving shaft, of a driven shaft, a driving member fixed on said driving shaft, a driven member feathered upon said driven shaft, a spring for forcing said driving shaft in one direction, a treadle mechanism for moving said shaft in a reverse direction, a rock shaft for shifting said driven member upon said driven shaft, a segment upon said rock shaft, and a lug upon said treadle arranged in the path of travel of said segment.

5. In a driving mechanism for ironing machines, the combination with a continuously rotating motor, of a driving shaft having a sliding connection with said motor, a driving member fixed upon said driving shaft, a spring surrounding said driving shaft for moving said shaft in one direction, a lever having a circular portion surrounding said driving shaft and having a connection therewith, a cable for operating said lever, a treadle for operating said cable, a driven member coöperating with said driving member, a rock shaft for operating said driven member, a segment upon said rock shaft, and a lug upon said treadle arranged in the path of travel of said segment.

6. In a driving mechanism, the combination with a driven member, of a rock shaft having a connection with said driven member, a segmental rack fixed on said rock shaft, a driving member, a spring for holding said driving member in contact with said driven member, a treadle for shifting said driving member, and a lug projecting from said treadle arranged in the path of travel of said segmental rack for locking said rock shaft.

7. In a driving mechanism, the combination with a driven member, a driving shaft, a driving member carried by said driving shaft for engaging the driven member, a bearing for said shaft, a collar fixed on said shaft, a coiled spring surrounding said shaft engaging said collar, a sleeve loosely mounted on said shaft carrying adjusting nuts engaging said spring, a thrust bearing carried by the first mentioned bearing, and a collar carried by said sleeve engaging said bearing.

In testimony whereof I affix my signature in presence of two witnesses.

WILLIAM BARTHOLOMEW.

Witnesses:
J. W. GRIFFEN,
J. HOERMANN.

Copies of this patent may be obtained for five cents each, by addressing the "Commissioner of Patents, Washington, D. C."